(12) United States Patent
Gershkovich et al.

(10) Patent No.: US 9,109,734 B2
(45) Date of Patent: Aug. 18, 2015

(54) GRIP RING FOR FITTING

(75) Inventors: Yefim Gershkovich, Tiberias (IL); Evgeny Nayman, Afula (IL); Tanyana Kogan, Afula (IL)

(73) Assignee: PLASSIM FITTINGS LTD., Merhavia (IL)

( * ) Notice: Subject to any disclaimer, the term of this patent is extended or adjusted under 35 U.S.C. 154(b) by 627 days.

(21) Appl. No.: 12/742,278

(22) PCT Filed: Nov. 11, 2008

(86) PCT No.: PCT/IL2008/001480
§ 371 (c)(1),
(2), (4) Date: May 11, 2010

(87) PCT Pub. No.: WO2009/060462
PCT Pub. Date: May 14, 2009

(65) Prior Publication Data
US 2010/0253074 A1     Oct. 7, 2010

Related U.S. Application Data

(60) Provisional application No. 60/987,067, filed on Nov. 11, 2007.

(51) Int. Cl.
*F16L 25/00* (2006.01)
*F16L 37/092* (2006.01)

(52) U.S. Cl.
CPC .................. *F16L 37/0925* (2013.01)

(58) Field of Classification Search
CPC .... F16L 37/088; F16L 37/091; F16L 37/0925
USPC .............................. 285/245, 249, 255, 332.1
See application file for complete search history.

(56) References Cited

U.S. PATENT DOCUMENTS

| | | | | |
|---|---|---|---|---|
| 1,802,572 A * | 4/1931 | Phillips | ........................ | 285/249 |
| 4,062,574 A * | 12/1977 | Scholin | ........................ | 285/340 |
| 5,335,946 A | 8/1994 | Dent | | |
| 5,390,969 A * | 2/1995 | Guest | .............................. | 285/38 |
| 5,730,476 A * | 3/1998 | Gouda | .......................... | 285/340 |
| 5,947,532 A | 9/1999 | Lorenz | | |
| 2004/0090067 A1* | 5/2004 | Pridham | ....................... | 285/328 |
| 2005/0035597 A1* | 2/2005 | Bamberger et al. | ........... | 285/340 |

FOREIGN PATENT DOCUMENTS

| | | |
|---|---|---|
| EP | 0 587 433 A | 3/1994 |
| WO | WO 01/55631 A | 8/2001 |
| WO | WO 03/046429 A | 6/2003 |

* cited by examiner

*Primary Examiner* — Michael P Ferguson
*Assistant Examiner* — Gwendolyn Driggers
(74) *Attorney, Agent, or Firm* — Arent Fox LLP

(57) ABSTRACT

Grip rings for pipe push-fit fitting devices, having an annular structure with an external surface which has a conical and curved like structure. On the inner surface of the grip ring two types of annular gripping teeth are placed. The annular grip ring is radially deformable and is a split type.

13 Claims, 6 Drawing Sheets

SECTION C-C

SECTION C-C

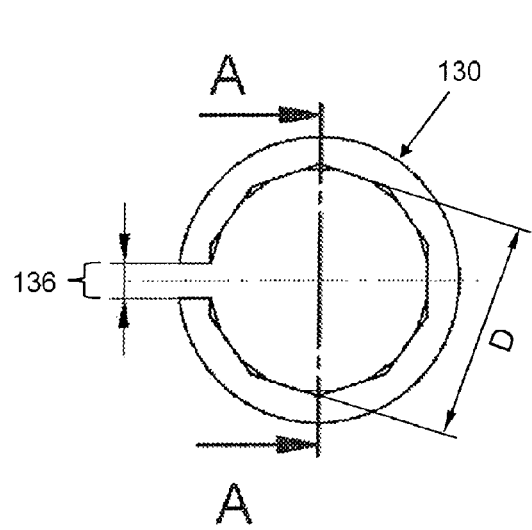
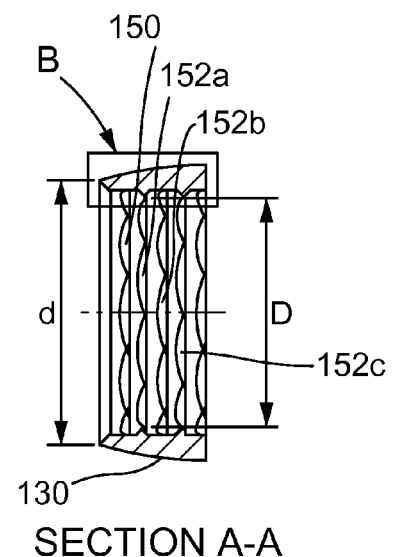
Fig 6     SECTION A-A   Fig 7
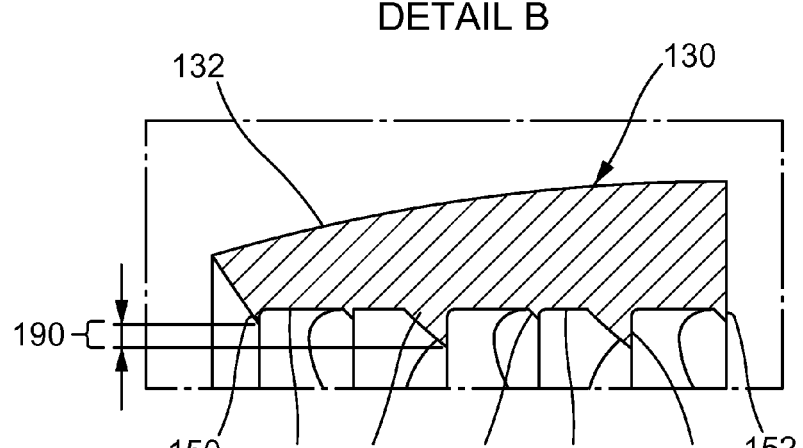
DETAIL B
Fig 8

GRIP RING FOR FITTING

CROSS-REFERENCE TO RELATED APPLICATION

This application is a National Stage entry of International Application No. PCT/IL2008/001480, filed Nov. 11, 2008, which claims priority to U.S. Provisional Patent Application No. 60/987,067, filed Nov. 11, 2007. The disclosures of the prior applications are each hereby incorporated in their entirety by reference herein.

FIELD OF THE INVENTION

This invention relates to grip rings for mechanical pipe fitting (coupling) devices and more particularly the present invention relates to grip ring for mechanical pipe fitting devices generally utilizing in all ends of a fitting device into which a pipe is inserted by a quick plug-in. The fitting devices are exemplary and the present invention is contemplated for use wherever grip ring are useful.

BACKGROUND OF THE INVENTION AND PRIOR ART

A plug-in pipe fitting device, also referred to as a push-fit pipe fitting device, typically includes a base body, an elastomeric sealing ring, an annular body which can be connected to the base body and a grip ring which locks in position a pipe end inserted into the push-fit fitting device. A grip ring typically enables smooth insertion of a pipe into the fitting device but disallows the removal of the pipe from the fitting device. The grip ring of the present invention provides an improved locking mechanism that enables a continuous mechanical gripping of a pipe end, pushed into the push-fit fitting device.

Many mechanical joining applications are used in pipe systems carrying liquids having temperatures up to approximately 110° C. and higher, and pressures up to approximately 1000 psi. As well fitting devices of this type are typically used with water pipe systems but can also used with fluids of all types, including toxic and volatile chemicals. In water pipe systems, the fittings are designated to be used with no leaks for a prolonged period of time, which is often 50 years and more.

There are many types of prior art grip rings used in the industry to lock pipes in position. The most common one is using FIG. 13 (Prior art) illustrates a prior art grip ring 10, having one or more annular saw teeth 20 and one or more slits 30 that enables reducing grip ring inner diameter when pushed inward by an external nut (not shown). US patent application 20050084327 by David Chelchowski et al provides such a grip ring, which may loosen up during a lifespan of a fitting device. The commonly used saw teeth mechanism allows the inserted pipe to slide over the gentler slope of the teeth, whereas when the pipe moves outwardly from the fitting device the teeth edge digs into the external surface of the pipe and locks the pipe in position.

There is therefore a need for and it would be advantageous to have a grip ring that locks the pipe in an increased force and increases the grip locking force when the pipe attempts to move out of the fitting device.

SUMMARY OF THE INVENTION

The principal intentions of the present invention include proving grip rings operatively coupled with pipe fitting devices and in particular with push-fit pipe fitting devices, the fitting device including a body, and a nut, a ring sealer and a grip ring at each end of the fitting device.

According to the teachings of the present invention there is provided a grip ring for a pipe fitting device, the fitting device having at least two tubular segments with an opening through which a pipe, having a longitudinal axis, is inserted, wherein the grip ring is disposed at each of the tubular segments to operatively restrain the inserted pipe. The grip ring includes:
a) an annular body;
b) an inner surface;
c) an external surface;
d) a first end operatively disposed proximately to the opening of the tubular segment of the fitting device;
e) a second end operatively disposed distally from the opening of the tubular segment of the fitting device;
f) a slit cut through the body of the grip ring, extending from the first end to the second end;
g) at least one segmented gripping tooth disposed on said inner surface.

The internal surface has a generally cylindrical structure. The external surface has a conical like structure, wherein the narrow end of the body is at the first end of the grip ring. When the grip ring is in a non compressed state, the distance between two opposing segments of each of the segmented gripping teeth is smaller than the external diameter of the inserted pipe.

In preferred variations of the present invention, the grip ring further includes at least one uniform annular gripping tooth disposed on said inner surface, wherein the uniform annular gripping tooth is disposed on the inner surface nearest to the first end of the grip ring, and at least one segmented gripping tooth is disposed adjacent to the uniform tooth.

In preferred variations of the present invention, the conical external surface is also spherical. Thereby, when the grip ring is being compressed, the edges of the uniform annular gripping tooth and of the segmented gripping teeth, move inwards substantially perpendicular to the external surface of the inserted pipe.

The profile of the uniform annular gripping teeth and the profile of the segmented gripping teeth, have a saw tooth shape, wherein the gentler slope of the teeth is the slope proximal to the first end. The height of the uniform annular gripping teeth, with respect to the inner surface, is lower than the height of the segmented gripping teeth, with respect to the inner surface.

An aspect of the present invention is to provide a grip ring, wherein the hardness of the materials from which the gripping teeth are made, is greater than the hardness of the material from which the inserted pipe is made.

In variations of the present invention, one of the uniform annular gripping teeth is disposed on the inner surface at the first end of the grip ring, and a multiple number of segmented gripping teeth are disposed adjacent to the uniform tooth.

In variations of the present invention, two of the uniform annular gripping teeth are disposed on the inner surface at the first end of the grip ring, and a multiple number of segmented gripping teeth are disposed adjacent to the uniform teeth.

In variations of the present invention, alternating pairs of teeth are disposed on the inner surface, wherein each pair of teeth includes one uniform annular gripping tooth and one segmented gripping tooth, and wherein a first uniform annular gripping tooth is disposed at the first end of the grip ring.

In variations of the present invention, the segmented gripping teeth include multiple segments being of substantially even size and wherein the edge of each segment typically forms a straight line. In some variations of the present invention, in each of the adjacent segmented gripping teeth, the segments coincide with corresponding segments in adjacent segmented teeth, and in some variations of the present invention, in each adjacent segmented gripping tooth, the segments are shifted with respect to corresponding segments in adjacent segmented teeth.

When a pipe is inserted into the opening of the tubular segment of the fitting device, the internal surface of the pipe slides over a ring seal, thereby obtaining a full sealing of the inside of the pipe. As the pipe continuous to move in, the external surface of the pipe slides over the uniform gripping tooth and expands the longitudinal opening of the grip ring with respect to the longitudinal axis of the pipe. As the pipe proceeds to move in, the external surface of the pipe slides over the segmented gripping teeth until the rim of the pipe reaches a stopper. After the pipe has reached the stopper of each of the tubular segment of the fitting device, when pressured liquid, such as water, flows into the fitting device, the internal pressure formed creates forces that attempt to move the inserted pipes out of the fitting device, whereas the outward movement of the pipes activates the gripping operation of the grip ring.

The gripping operation of the grip ring includes the following steps:
a) the conical and spherical external surface of the grip ring encounters an inner conical surface of a nut of the fitting device;
b) the inner conical surface of the nut pushes the grip ring inwardly towards the longitudinal axis of the pipe, and thereby compresses the grip ring;
c) the segments of the segmented gripping teeth move forcefully inwardly towards said longitudinal axis of the pipe, and thereby strengthen the grip on the pipes, to lock said pipes into position;
d) the uniform gripping tooth also encounters the external surface of the pipe; and
e) the uniform gripping teeth are imbedded into the external surface of the pipe, thereby further strengthening the grip of the grip rings on corresponding pipes.

In variations of the present invention, where the grip ring includes just one or more segmented gripping teeth, when a pipe is inserted into the opening of the tubular segment of the fitting device, the internal surface of the pipe slides over a ring seal, thereby obtaining a full sealing of the inside of the pipe. As the pipe continuous to move in, the external surface of the pipe slides over the segmented gripping teeth and expands the longitudinal opening of the grip ring with respect to the longitudinal axis of the pipe. The pipe proceeds to move in until the rim of the pipe reaches a stopper.

BRIEF DESCRIPTION OF THE DRAWINGS

The present invention will become fully understood from the detailed description given herein below and the accompanying drawings, which are given by way of illustration and example only and thus not limitative of the present invention, and wherein:

FIG. 6 is a back view illustration of a grip ring, according to embodiments of the present invention;

FIG. 7 is an A-A cross section of the grip ring shown in FIG. 6;

FIG. 8 is a magnification of window B shown in FIG. 7;

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The methods and examples provided herein are illustrative only and not intended to be limiting.

By way of introduction, the principal intentions of the present invention include proving grip rings operatively coupled with pipe fitting devices and in particularly with push-fit pipe fitting devices, whereas at least one grip ring is used on each end of a push-fit pipe fitting device.

Figure 1:
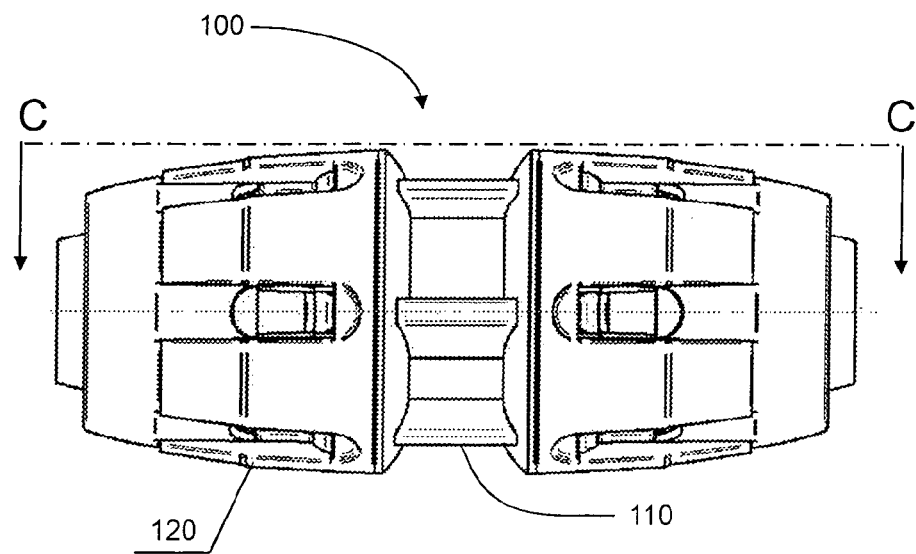
FIG. 1 is a side view illustration of a push-fit pipe fitting device, containing two grip rings, according to embodiments of the present invention.
Figure 2:
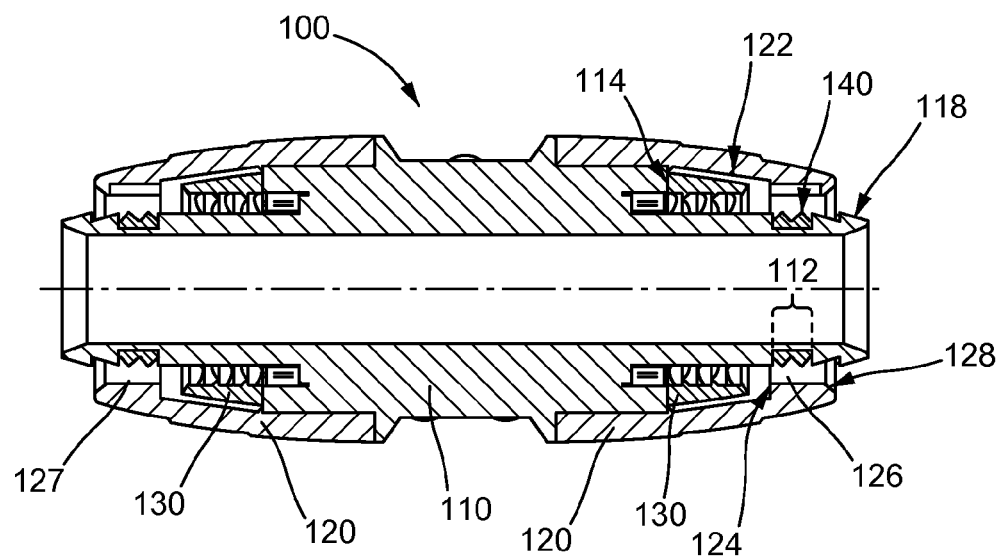
FIG. 2 is a C-C cross section of the push-fit pipe fitting device shown in FIG. 3.

Reference is now made to the drawings. FIG. 1 is a side view illustration of a push-fit pipe fitting device 100 and FIG. 2 is a C-C cross section of fitting device 100 shown in FIG. 1, wherein fitting device 100 contains two grip rings 130, according to embodiments of the present invention. Fitting device 100 also includes body 110, nuts 120 and ring seals 140. Nut 120 (FIGS. 1 and 2), includes an internal conical surface 122, a step stopper 124, an opening 126 into which a pipe is inserted and a conical surface 128 at the entrance. Body 110 of fitting device 100 includes an external conical surface 118 at the entrance of each end, and grooves 112 that house ring seals 140.

Figure 3:
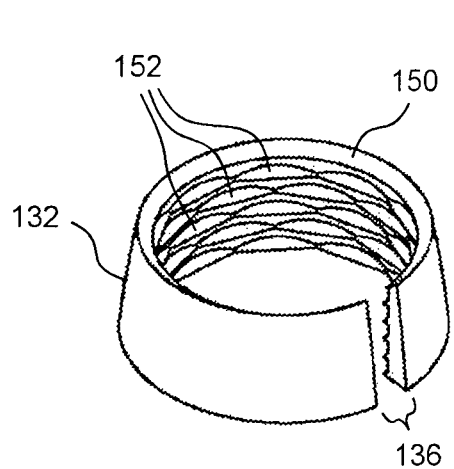
FIG. 3 is a side perspective view illustration of a grip ring, according to embodiments of the present invention.
Figure 4:
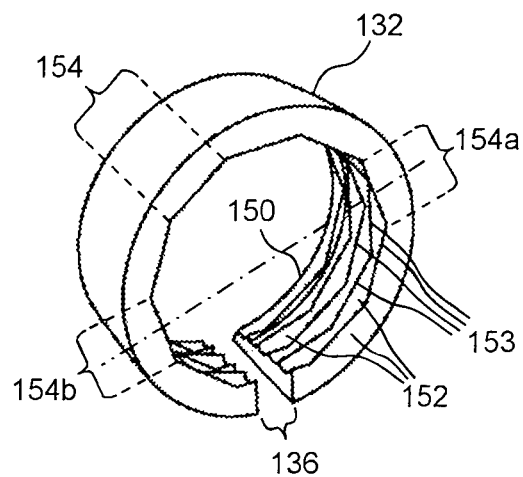
FIG. 4 is a back perspective view illustration of a grip ring, according to embodiments of the present invention.
Figure 5:
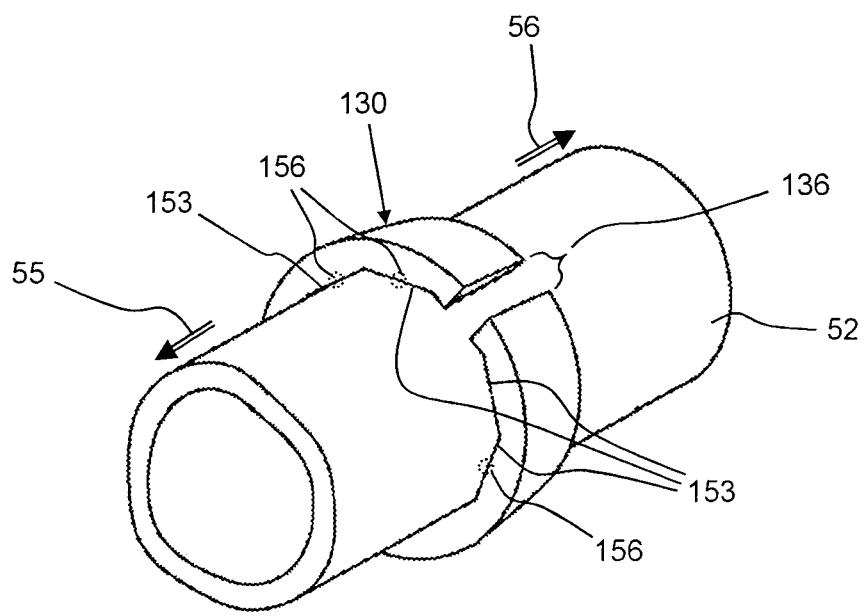
FIG. 5 is a perspective view illustration of a grip ring, according to other embodiments of the present invention, having a pipe inserted into the grip ring.

Reference is also made to FIGS. 3-7: FIG. 3 is a side perspective view illustration of a grip ring 130, according to embodiments of the present invention, and FIG. 4 is a back perspective view of grip ring 130 shown in FIG. 3; FIG. 5 is a perspective view illustration of a grip ring, according to other embodiments of the present invention, having a pipe inserted into the grip ring; FIG. 6 is a side view illustration of a grip ring 130, according to embodiments of the present invention; FIG. 7 is an A-A cross section of a grip ring 130, according to embodiments of the present invention and FIG. 8 is a magnification of window B shown in FIG. 7.

Grip ring 130 is placed inside fitting device 100 against wall 114 of body 110. Grip ring 130 has an annular structure, whereas in a longitudinal cross section of grip ring 130, external surface 132 of the grip ring 130 has a conical like structure. On inner surface 134 of grip ring 130 two types of annular gripping teeth (150 and 152) are places. Annular grip ring 130 of the present invention needs to be radially deformable and slit 136 allows grip ring 130 to be compressed. External surface 132 of grip ring 130 of the present invention is preferably spherical to make the gripping operation more effective.

In the preferred embodiment of the present invention, inner surface 134 of grip ring 130 contains annular gripping teeth 150 and 152, whereas the first annular gripping tooth is preferably gripping tooth 150 (with respect to the narrow side of conical grip ring 130), which has a uniform cross section of a saw tooth (FIG. 8). Grip ring 130 is designed such that when a pipe 52 is inserted in direction 55 into fitting device 100, pipe 52 enters grip ring 130 from the narrow end of grip ring 130 and firstly encounters gripping tooth 150, whereas pipe 52 slides over the gentler slope of gripping tooth 150. Should pipe 52 be moved in the opposite direction, direction 56, gripping tooth 150 will imbed into the external surface of pipe 52 and lock pipe 52 in position.

Inner surface 134 of grip ring 130 further contains one or more annular gripping teeth 152 and preferably, at least two gripping teeth 152. A gripping tooth 152 is composed of multiple segments 154, whereas in each adjacent gripping tooth 152, the segments are preferably shifted. Segments 154 of gripping tooth 152b (FIG. 7), for example, are shifted by half a segment 154 length relative to segments 154 of gripping tooth 152a, and segments 154 of gripping tooth 152c, for example, are shifted by half a segment length relative to segments 154 of gripping tooth 152b. Hence, in this example, segments 154 of gripping tooth 152a and segments 154 of gripping tooth 152c coincide. Preferably, edges 153 of segments 154 form substantial straight lines.

Gripping tooth 150 is preferable the first annular gripping tooth, with respect to the narrow side of conical grip ring 130. The height of gripping tooth 150 is lower than the height of gripping teeth 152 by a height difference of 190.

Figure 9:
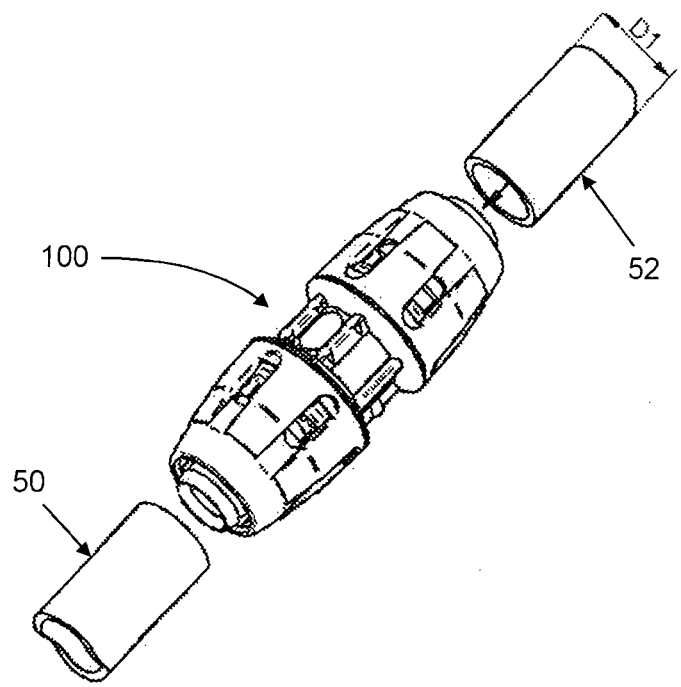
FIG. 9 is a perspective view illustration of a push-fit pipe fitting device, containing two grip rings, according to embodiments of the present invention, and two pipe ends to be joint by the fitting device.

Reference is also made to FIG. 9, which is a perspective view illustration of a push-fit pipe fitting device 100, containing two grip rings 130 (not shown), according to embodiments of the present invention, and two pipe ends 50 and 52 to be joined by fitting device 100. Diameter D (FIGS. 6 and 7), which is the distance between two opposing segments of a gripping tooth 152 (such as segments 154a and 154b as shown in FIG. 4) in a non compressed state, is smaller than external diameter D1 of pipe 52. The hardness of the materials from which gripping teeth 150 and 152 are made, is greater than the hardness of the material from which pipe 52 is made.

Figure 10:
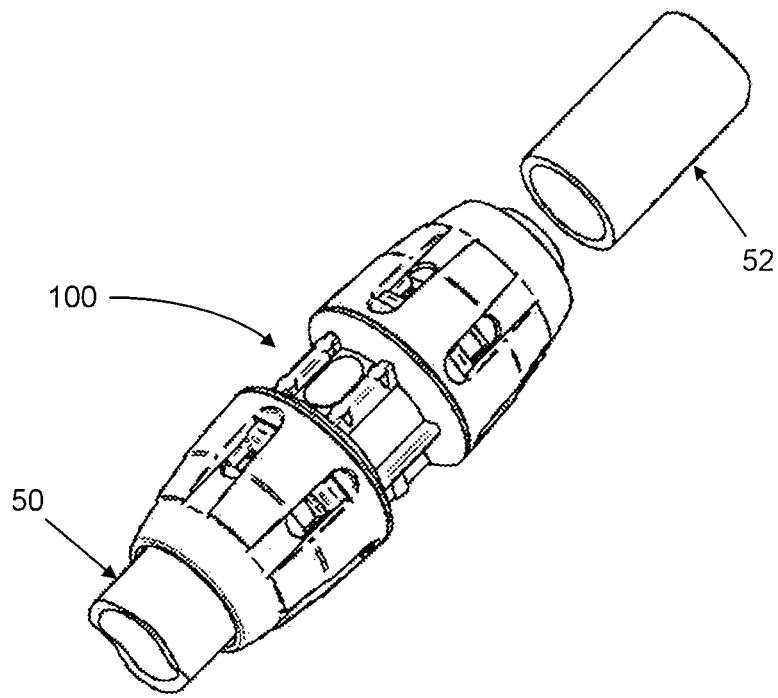
FIG. 10 is a perspective view illustration of the push-fit pipe fitting device shown in FIG. 9, having one pipe pushed into the fitting device.

Reference is also made to FIG. 10, which is a perspective view illustration of the push-fit pipe fitting device 100 shown in FIG. 9, having pipe pushed into one end of fitting device 100. When a pipe 50 is pushed into fitting device 100, forces are applied onto various parts of fitting device 100.

Pipe 50 is inserted into fitting device 100 via conical surface 118, whereas conical surfaces 128 and 118 centralize the motion of pipe 50 with respect to the axis of fitting device 100. Internal surface 127 of nut 120 brings the axis of pipe 50 to coincide with the axis of fitting device 100.

As pipe 50 moves in, the internal surface of pipe 50 slides over and compresses the ring seals 140, thereby obtaining a full sealing of the inside of pipe 50. As pipe 50 continues to move in, the external surface of pipe 50 reaches gripping tooth 150 of grip ring 130, slides over gripping tooth 150 and expands slit 136 of grip ring 130. Pipe 50 proceeds moving in sliding over gripping teeth 152 until the rim of pipe 50 reaches stopper 114.

Since D is smaller than D1, grip ring 130 embraces the external surface of pipe 50, whereas the force at which grip ring 130 embraces the external surface of pipe 50 depends directly on the difference (D–D1). The force at which grip ring 130 embraces the external surface of pipe 50 also depends on the material from which grip ring 130 is made.

Initially, only central points 156 of edges 153 of segments 154 hold the external surface of pipe 50 (FIG. 5). At this point, gripping tooth 150 does not touch or hold the external surface of pipe 50. The positioning of central points 156 of edges 153 of segments 154 on the external surface of pipe 50 form the shape of split type grip ring 130, regardless of the curvature of pipe 50. It should be noted that all activities described relating to pipe 50 is also relevant to pipe 52.

When pressured liquid, such as water, flows into the fitting device 100, the internal pressure, formed inside pipes 50 and 52, creates forces that attempt to move pipes 50 and 52 out of fitting device 100. The outward movement of pipes 50 and 52 activate the gripping operation of grip ring 130.

The conical and spherical external surface 132 of grip ring 130 encounters conical surface 122 of nut 120, thereby spherical surface 132 is being pushed inwards while grip ring 130 is compressed. Segments 154 of gripping teeth 152 forcefully move inwards thereby strengthening the grip of segments 154 in pipes 50 and 52 and further penetrate into the external surface of pipes 50 and 52 to lock pipes 50 and 52 in position. At a certain penetration level of segments 154 into pipes 50 and 52, gripping tooth 150 also reaches the external surface of pipes 50 and 52. Further compression of grip rings 130 also imbed gripping tooth 150 into the external surface of pipes 50 and 52, thereby further strengthening the grip of grip rings 130 in pipes 50 and 52.

Figure 11:
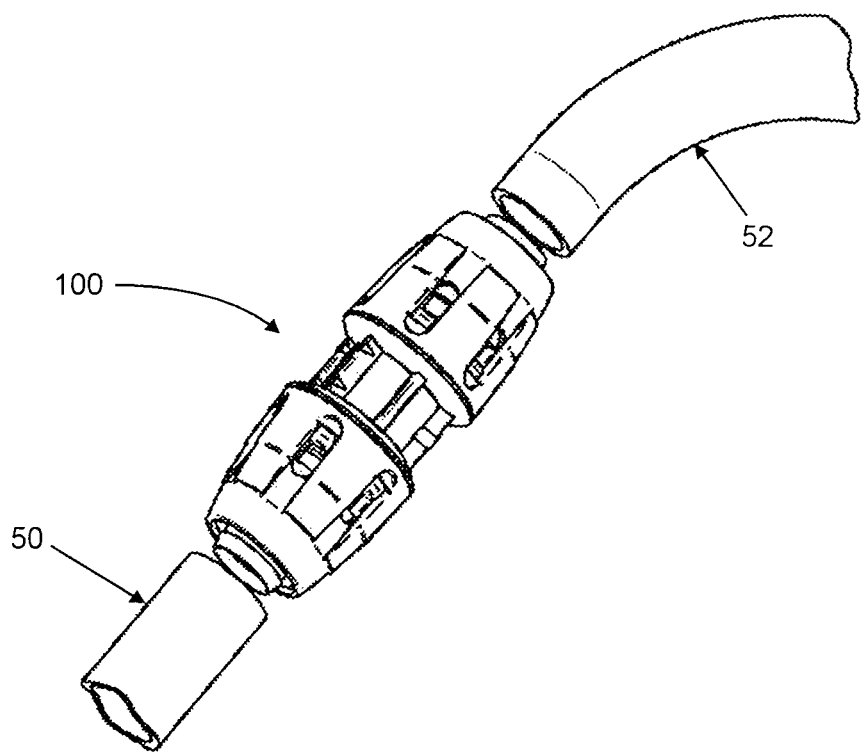
FIG. 11 is a perspective view illustration of the push-fit pipe fitting device shown in FIG. 9, having one pipe bended.

Reference is also made to FIG. 11, which is a perspective view illustration of push-fit pipe fitting device 100 shown in FIG. 9, having pipe 52 bended. When pressurized liquid flows into fitting device 100, the internal pressure formed inside pipes 50 and 52, create forces that attempt to move pipes 50 and 52 out of fitting device 100. The outwardly movement of pipe 52 has some curved vector, depending on the curvature of pipe 52. But the inwardly movement of gripping teeth 150 and 152 is not influenced by the curvature of pipe 52 thanks to the spherical shape of surface 132, which directs the inwardly movement of teeth 150 and 152 to be substantially perpendicular to the longitudinal axis of pipe 52.

The inward movement of gripping teeth 150 and 152 stop when surface 134 reaches the external surface of pipes 50 and 52, or when grip ring 130 reaches stopper 124.

It should be noted that segments 154 of gripping teeth 152 perform the initial grip of pipes 50 and 52. Since segments 154 of each adjacent gripping tooth 152 are shifted, a better and stronger grip of pipes 50 and 52 is obtained by having a better spread of contact points 156. The shift of segments 154 of gripping tooth 152a can be, for example, half a segment length relative to segments 154 of gripping tooth 152b (FIG. 7). Thereby, in this example, segments 154 of gripping tooth 152a and segments 154 of gripping tooth 152b coincide. The shift of segments 154 of gripping teeth 152 can be, for example, a third of a segment length relative to segments 154 of an adjacent gripping tooth 152. Thereby, in this example, segments 154 of gripping tooth 152 and segments 154 of a third gripping tooth 152 coincide. The shift can also be by any other radial distance and can be different from one pair of adjacent gripping teeth 152 to another.

Figure 12A:
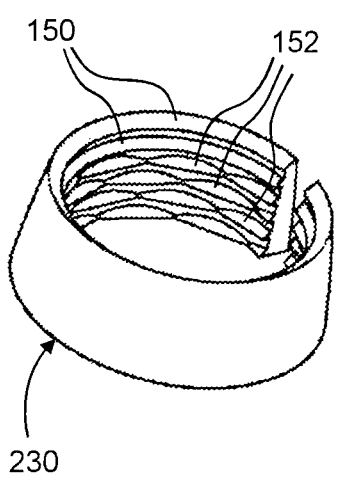
FIGS. 12a and 12b are perspective view illustrations of grip rings, according to other embodiments of the present invention.
Figure 12B:
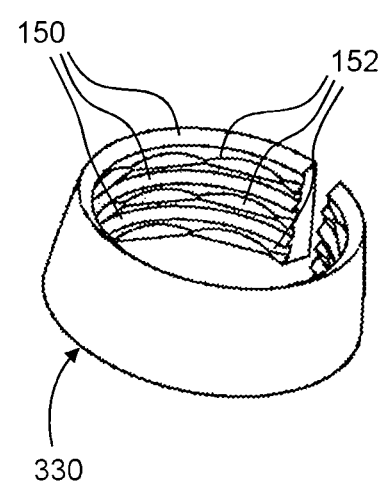
Figure 13:
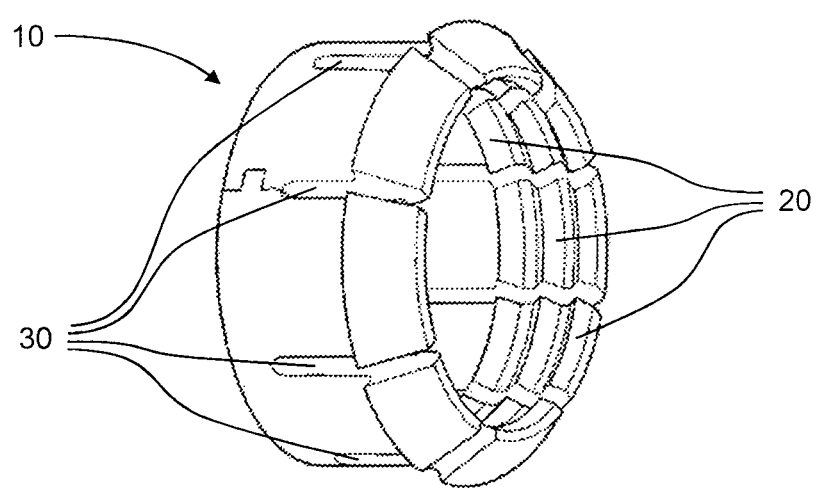
FIG. 13 (prior art) shows an example of a prior art grip ring.

In different embodiments of the present invention, grip ring 130 may have a different number of gripping teeth 150, a different number of gripping teeth 152 and a different order of gripping teeth 150 and 152. Reference is now made to FIGS. 12a and 12b, which illustrate examples of grip rings, according to other embodiments of the present invention. In the example shown in FIG. 12a, grip ring 230 includes gripping teeth in the following types and order: two (2) gripping teeth 150 and four (4) gripping teeth 152. In the example shown in FIG. 12b, grip ring 330 includes alternating gripping teeth 150 and 152 a first gripping tooth 150 (with respect to the narrow side of conical grip ring 130), then gripping tooth 152 and so on, three of each gripping tooth type. The grip rings (230, 330) shown in FIGS. 12a and 12b are given by way of example only and any other number of gripping teeth 150 and 152 and a different order of gripping teeth 150 and 152 is within the scope of the present invention.

It should be noted that grip ring 130, 230 and 330 can be made of any rigid material known in the art.

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. A grip ring for a pipe fitting device, said fitting device having at least two tubular segments with an opening through which a pipe, having a longitudinal axis, is inserted, wherein the grip ring is disposed at the opening of the tubular segments to operatively restrain said inserted pipe, the grip ring comprising:
   a) an annular body;
   b) an inner surface;
   c) an external surface;
   d) a first end operatively disposed proximately to said opening of said tubular segment of said fitting device;
   e) a second end operatively disposed distally from said opening of said tubular segment of said fitting device;
   f) a slit cut through said body, extending from said first end to said second end;
   g) at least two segmented gripping teeth disposed on said inner surface comprising a first segmented gripping tooth and an adjacent second segmented gripping tooth, said inner surface having a generally cylindrical structure; and
   h) at least one uniform annular gripping tooth disposed on said inner surface;
   wherein said external surface is conical shaped, wherein a narrow end of said body is at said first end of said grip ring;
   wherein the at least two segmented gripping teeth each comprise multiple segments bordering circumferentially along the inner surface;
   wherein each segment of the multiple segments comprises a linear edge having two endpoints and having a height from the inner surface which varies along a length of the linear edge;
   wherein the height of the linear edge is a minimum at the two endpoints and wherein the endpoints of each segment of the multiple segments shares a common endpoint with an adjoining segment of the multiple segments;
   wherein the linear edges of the first segmented gripping tooth are circumferentially misaligned with the linear edges of the adjacent second segmented gripping tooth;
   wherein a distance between a pair of diametrically opposed segments of the at least one segmented gripping tooth is smaller than an external diameter of said inserted pipe when said grip ring is in a non compressed state; and
   wherein a height of said at least one uniform annular gripping tooth, with respect to said inner surface, is lower than a height of said at least one segmented gripping tooth, with respect to said inner surface.

2. The grip ring of claim 1, wherein said at least one uniform annular gripping tooth is disposed on said inner surface nearest to said first end of said grip ring; and wherein said at least two segmented gripping teeth is disposed adjacent to said at least one uniform annular gripping tooth.

3. The grip ring of claim 1, wherein a profile of said at least one uniform annular gripping tooth and the profile of said at least two segmented gripping teeth, have a saw tooth shape, wherein a greater slope of the teeth is a slope proximal to said first end.

4. The grip ring of claim 1, wherein a hardness of materials from which said at least one uniform annular gripping tooth and said at least two segmented gripping teeth are made, is greater than the hardness of material from which said inserted pipe is made.

5. The grip ring of claim 1, wherein said at least one uniform annular gripping tooth is disposed on said inner surface at said first end of the grip ring, and a multiple number of said at least two segmented gripping teeth are disposed adjacent to said at least one uniform annular gripping tooth.

6. The grip ring of claim 1,
   wherein said at least one segmented gripping tooth is at least two uniform annular gripping teeth;
   wherein said at least two uniform annular gripping teeth are disposed on said inner surface at said first end of the grip ring, and a multiple number of said at least two segmented gripping teeth are disposed adjacent to said at least two uniform annular gripping teeth.

7. The grip ring of claim 1, wherein alternating pairs of teeth are disposed on said inner surface, wherein each pair of teeth comprises one of said at least one uniform annular gripping tooth and one of said at least two segmented gripping teeth, and wherein a first uniform annular gripping tooth of the at least one uniform annular gripping tooth is disposed at said first end of the grip ring.

8. The grip ring of claim 1, wherein said multiple segments have substantially even size.

9. The grip ring of claim 1, wherein when said pipe is inserted into said opening of said tubular segment of said fitting device, an internal surface of said pipe slides over a ring seal, thereby obtaining a full sealing of an inside of the pipe; wherein as said pipe moves within said fitting device, an external surface of said pipe slides along said at least two segmented gripping teeth and expands the slit of the grip ring with respect to said longitudinal axis of said pipe; and wherein said pipe further moves within said fitting device until a rim of said pipe reaches a stopper.

10. The grip ring of claim 1, wherein said conical external surface is also curved; thereby, when the grip ring is being compressed, edges of said at least one uniform annular gripping tooth and said at least two segmented gripping teeth, move inwards substantially perpendicular to an external surface of said inserted pipe.

11. The grip ring of claim 10, wherein when said pipe is inserted into said opening of said tubular segment of said fitting device, an internal surface of said pipe slides over a ring seal, thereby obtaining a full sealing of an inside of the pipe; wherein as said pipe moves within said fitting device, the external surface of said pipe slides along said at least one uniform annular gripping tooth and expands the slit of the grip ring with respect to said longitudinal axis of said pipe; and wherein as said pipe further moves within said fitting device, said external surface of said pipe slides along said at least two segmented gripping teeth until a rim of said pipe reaches a stopper.

12. The grip ring of claim 11, wherein after said pipe has reached said stopper of each of said tubular segment of said fitting device, when pressured liquid flows into said fitting device, internal pressure formed creates forces that attempt to move said inserted pipes out of said fitting device, wherein said outward movement of said pipes activates a gripping operation of the grip ring.

13. The grip ring of claim 12, wherein the grip ring is configured such that:
   a) said conical and curved external surface of the grip ring encounters an inner conical surface of a nut of said fitting device;
   b) said inner conical surface of said nut pushes the grip ring inwardly towards said longitudinal axis of said pipe, and thereby compressing the grip ring;
   c) said multiple segments of said at least two segmented gripping teeth move forcefully inwardly towards said longitudinal axis of said pipe, and thereby strengthen a grip on said pipes, to lock said pipes into position;
   d) said at least one uniform annular gripping tooth also encounters said external surface of said pipe; and
   e) said at least one uniform annular gripping tooth is imbedded into said external surface of said pipe, thereby further strengthening the grip of the grip rings on said pipes.

* * * * *